United States Patent
Takeuchi et al.

[11] Patent Number: 5,231,294
[45] Date of Patent: Jul. 27, 1993

[54] MANGANESE-ALUMINUM AND MANGANESE-SILICON MAGNETIC FILMS, AND MAGNETIC RECORDING MEDIUM

[75] Inventors: Teruaki Takeuchi, Hachioji; Masaaki Futamoto, Kanagawa; Yukio Honda, Fuchu; Kazumasa Takagi, Tokyo; Yoshiyuki Hirayama, Kokubunji, all of Japan

[73] Assignee: Hitachi, Ltd., Tokyo, Japan

[21] Appl. No.: 679,991

[22] Filed: Mar. 29, 1991

Related U.S. Application Data

[63] Continuation-in-part of Ser. No. 609,093, Oct. 31, 1990, abandoned, which is a continuation-in-part of Ser. No. 327,008, Mar. 22, 1989, abandoned.

[30] Foreign Application Priority Data

| Mar. 25, 1988 | [JP] | Japan | 63-69414 |
| Mar. 30, 1990 | [JP] | Japan | 2-80742 |
| Oct. 5, 1990 | [JP] | Japan | 2-266209 |

[51] Int. Cl.$^5$ ............................................. H01L 23/48
[52] U.S. Cl. ........................................ 257/28; 257/15; 365/173; 428/611
[58] Field of Search ............... 357/71, 27; 360/126; 428/337; 365/59

[56] References Cited

U.S. PATENT DOCUMENTS

| 3,518,639 | 6/1970 | Feldtkeller et al. | 365/59 |
| 4,201,809 | 5/1980 | Ogawa et al. | 428/337 |
| 5,032,465 | 7/1991 | Maeda | 428/611 |

FOREIGN PATENT DOCUMENTS 1247398 8/1967 Fed. Rep. of Germany.

OTHER PUBLICATIONS

Synthesis of ferromagnetic $\pi$ phase of Mn-Al films by sputtering A. Morisako and M. Matsumoto Apr. 15, 1987 J. Appl. Phys. 61 pp. 4281-4283.
Ferromagnetic resonance in Co-Cr Multilayer films B. L. Ramakrishna et al. J. Appl. Phys. 61 Apr. 15, 1987 pp. 4290-4292.

Primary Examiner—William Mintel
Assistant Examiner—Roy Potter
Attorney, Agent, or Firm—Fay, Sharpe, Beall, Fagan, Minnich & McKee

[57] ABSTRACT

A ferromagnetic thin film of manganese and aluminum having varied atomic concentrations of manganese and aluminum in the direction perpendicular to the film plane, preferably the Mn atomic concentration being preferably in a range of 45 to 65% by atom, has a spontaneous magnetization equivalent to that of the bulk of manganese-aluminum alloy and also a high magnetic anisotropy.

In addition, a magnetic recording medium comprises a substrate and a magnetic film formed on the substrate, the magnetic film being a thin film in a stacked structure of thin layers of manganese and thin layers of aluminum, laid open upon one another alternatingly in the film thickness direction.

Finally, a manganese-silicon magnetic multi-layer film comprises thin layers of manganese and thin layers of silicon laid upon one another alternatingly.

9 Claims, 8 Drawing Sheets

211 Mn-Si FERROMAGNETIC MULTI-LAYER FILM
212 SUBSTRATE

FIG. IA
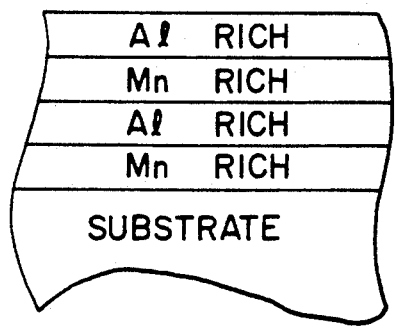
FIG. IB
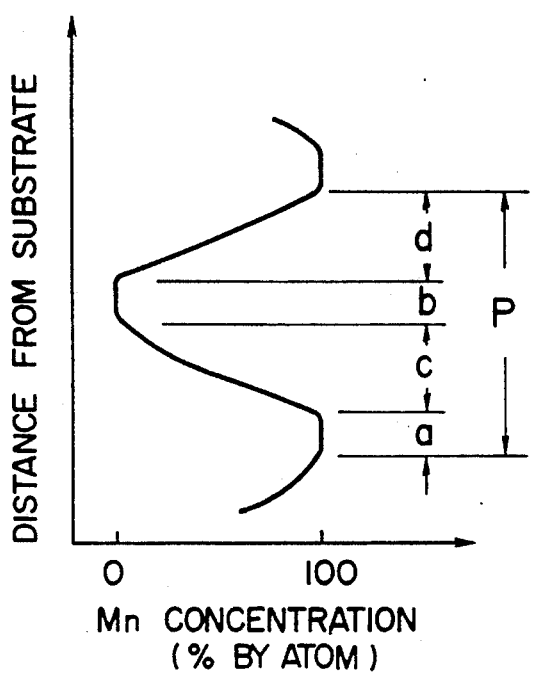
FIG. IC
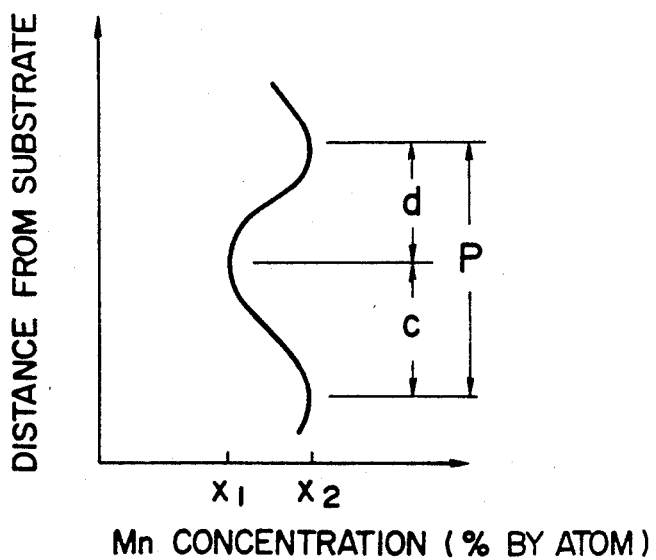

211 Mn-Si FERROMAGNETIC MULTI-LAYER FILM
212 SUBSTRATE

213 Si ATOM
214 Mn ATOM

MANGANESE-ALUMINUM AND MANGANESE-SILICON MAGNETIC FILMS, AND MAGNETIC RECORDING MEDIUM

This is a continuation-in-part of copending application(s) Ser. No. 07/609,093 filed on Oct. 31, 1990, which was a Rule 62 continuation-in-part of Ser. No. 07/327,008 filed Mar. 22, 1989, both now abandoned.

BACKGROUND OF THE INVENTION

This invention relates to a thin film of manganese-aluminum alloy and more particularly to a film suitable for generating spontaneous magnetization and magnetic anisotropy as high as those of a bulk of this alloy.

This invention is further directed to a magnetic recording medium, such as a magnetic disc, etc.

The present invention relates to a structure of ferromagnetic film having a high saturation magnetization necessary for drastic improvement of characteristics of magnetic devices such as magnetic heads, etc. in magnetic recording apparatuses and to a method for producing the same.

In magnetic recording media such as magnetic discs, etc., an increase in recording density is the most important task, and thus it is important in any of systems of in-plane magnetic recording and perpendicular magnetic recording to optimize the characteristics of magnetic film. Particularly important characteristics include a saturation magnetic flux density, a ratio of residual magnetization to saturation magnetization, i.e., so-called squareness ratio, and a coercivity.

These magnetic characteristics have so far been controlled mainly by adjusting the film composition, that is, by changing the composition ratio of constituent elements in the film or adding a very small amount of other elements to the film. For example, in case of Co-Cr-Pt alloy film disclosed in Japanese Patent Application Kokai (Laid-Open) No. Hei 1-28383, the magnetic characteristics are controlled by adjusting the composition ratio of Co, Cr, and Pt, film thickness, thickness of Cr layer as an underlayer, etc.

Development of magnetic members having a high saturation magnetization which cannot be obtained by conventional magnetic films has been desired for further improvement of magnetic devices. Alloys composed mainly of iron have been studied as magnetic members having a high saturation magnetization. However, it has been found that the alloys have critical saturation magnetization values which are almost equal to the saturation magnetization value of iron (2.2 tesla).

Recently, multi-layer films comprising different kinds of thin layers of different elements as alternatingly laid upon one another have attracted attention to attain the aim to make the alloy saturation magnetization surpass the critical value. As one of the multi-layer films, a multi-layer film comprising manganese and aluminum is disclosed in Japanese Patent Application No. Hei 1-229151. The disclosed multi-layer film shows good magnetic characteristics, particularly a high saturation magnetization, but has suffered from the problem that the film is apt to undergo changes in the characteristics by the heat treatment at about 300° C. which is conducted in the processing of the film.

It is known that an alloy of manganese (Mn) and aluminum (Al) becomes ferromagnetic in some crystal structures and its bulk crystal is applied to a permanent magnet, etc. Recently, attempts have been made to make a thin film from this material. One example is a film of Mn-Al formed by sputtering, as disclosed in J. Appli. Phys. 61 (1987) pp 4281-4283, where an atomic ratio of Mn to Al is constant throughout the film.

The foregoing prior art has such a problem that, even if the film-forming conditions are changed, the resulting films have a maximum spontaneous magnetization of 120 emu/cc, which is about one-fourth of that of the bulk of the alloy, because the resulting films contain a non-magnetic structure ($\epsilon$ phase) together with a structure generating a ferromagnetic property ($\tau$ phase), even if the atomic ratio of Mn to Al is constant.

SUMMARY OF THE INVENTION

A first object of the present invention is to provide a thin film of Mn-Al having a $\tau$ phase throughout the film and an equivalent spontaneous magnetization to that of the bulk of the alloy.

In a magnetic device, the magnetic anisotropy is an important characteristic, and, for example, in the perpendicular magnetic recording, the anisotropy perpendicular to the film is indispensable.

A second object of the present invention is to generate the magnetic anisotropy which has not been obtained in the foregoing prior art.

A third object of the present invention is to provide a magnetic recording medium having desired magnetic characteristics only by changing the structure of a magnetic film, irrespective of the composition of the magnetic film.

A fourth object of the present invention is to provide a film which is small in changes of characteristics against increasing temperature and has a higher saturation magnetization over the critical saturation magnetization value in such alloys as mentioned above.

The first object of the present invention can be attained by producing a film of Mn-Al having a Mn atomic concentration substantially constant in the direction of film plane and varied in the direction perpendicular to the film plane within a range of 45 to 65% by atom throughout the film.

The present invention has been made on the basis of the following findings.

A low spontaneous magnetization in the prior art is due to the fact that the $\tau$ phase of ferromagnetic structure is in a metastable state and the present inventors have made a search for conditions for more stably generating the $\tau$ phase than the $\epsilon$ phase. As one of several measures, various alloys of Mn-Al having different spontaneous magnetization were cut and the structures of the cross-sections were microscopically investigated. As a result, it was found that the alloys having a high spontaneous magnetization were composed only of the $\tau$ phase, whereas the alloys having a low spontaneous magnetization were composed of the $\tau$ phase and $\epsilon$ phase in a mixture. Further examination of atomic concentration of the $\tau$ phase-existing region revealed that the atomic concentration of Mn in the $\tau$ phase was 45 to 65% by atom and the composition was not constant.

On the basis of the foregoing findings, the present inventors presumed that a higher spontaneous magnetization could be obtained by artificially varying the atomic concentration of Mn in a range of 45 to 65% by atom even in a thin film, thereby preferentially forming the $\tau$ phase and tried to change the composition according to a thin film stacking technology. That is, the present inventors presumed that the atomic concentration of Mn could be varied in the direction perpendicular to the film plane by alternately stacking Mn and Al layers on a substrate by vacuum evaporation, etc., and subjecting the layers each of these two elements Mn and Al to an interdiffusion.

On the basis of this presumption, various thin films having different shapes of distribution of Mn atomic concentration were prepared by changing the deposition rate, deposition time and substrate temperature as parameters.

The structures of the thus prepared thin films are alternately stacked structures of Mn-rich layers and Al-rich layers, as shown in FIG. 1A. The distribution of the atomic concentration of Mn in the direction perpendicular to the film plane is as shown in FIG. 1B, where changes in the atomic concentration of Mn in a stacked state of a Mn-rich layer, an Al-rich layer, a Mn-rich layer and so forth are shown. The atomic concentration of Al is a value obtained by subtracting the atomic concentration of Mn from 100%. A range of changes in the atomic concentration of Mn is from 0 to 100% by atom. The regions a and b are pure Mn and Al regions, respectively, which are kept free from mixing of Mn and Al, even if an interdiffusion of Mn and Al takes place. Regions c and d are regions where Mn and Al are interdiffused and the atomic concentration of Mn is gradually changed. When the layer thickness is small, the interdiffusion of Mn and Al takes place throughout all the Mn layers and Al layers, and consequently there are no such regions a and b, but only regions c and d with changes in the composition. Distribution of the atomic concentration of Mn in the direction perpendicular to the film plane in the latter case is shown in FIG. 1C, where the range of changes in the atomic concentration of Mn $x_1$ and $x_2$.

Deposition conditions, distribution of the atomic concentration of Mn and magnetic properties such as spontaneous magnetization, etc. of thin films prepared in Examples which follow are shown in the following Table.

TABLE 1

| Sample No. | Deposition condition | | | | | | Distribution of Mn atomic concentration Shape of distribution (Å) | |
|---|---|---|---|---|---|---|---|---|
| | Substrate temperature (°C.) | Shutter release time (sec) | | Deposition rate (Å/sec) | Number of stacked layers | Substrate | a (constant) | b (constant) |
| | | Mn | Al | | | | | |
| 1 | 250 | 10 | 10 | 0.5 | 1000 | Glass | 0 | 0 |
| 2 | " | " | " | " | 50 | " | " | " |
| 3 | 200 | 8 | 8 | " | 1000 | " | " | " |
| 4 | 300 | 10 | 10 | " | 1000 | " | " | " |
| 5 | 250 | 11 | 9 | " | 1000 | " | " | " |
| 6 | 200 | 12 | 8 | " | 1000 | MgO | " | " |
| 7 | " | " | " | " | 100 | " | " | " |
| 8 | 350 | " | " | " | 1000 | " | " | " |
| 9 | 300 | 10 | 10 | 1 | 500 | Glass | 0 | 0 |
| 10 | " | " | " | " | " | " | " | " |
| 11 | 250 | 10–12 | 8–10 | 0.5 | 1000 | " | " | " |
| 12 | 200 | 40 | 40 | " | 1000 | " | 5 | 5 |
| 13 | " | " | " | " | 100 | " | " | " |

| Distribution of Mn atomic concentration | | | | | | Magnetic properties | |
|---|---|---|---|---|---|---|---|
| Shape of distribution (Å) | | Span of each region (= a + b + c + d) (Å) | Mn concentration | | Rate of Mn atomic concentration change $(x_2-x_1)/C$ | Anisotropy field $H_k$ (Oe) | Spontaneous magnetization of film Ms (emu/cc) |
| c (varied) | d (varied) | | minimum $x_1$ | maximum $x_2$ | | | |
| 5 | 5 | 10 | 46 | 54 | 1.6 | 1400 | 450 |
| " | " | " | " | " | " | " | " |
| 4 | 4 | 8 | 45 | 55 | 2.5 | 2200 | " |
| 5 | 5 | 10 | 47 | 53 | 1.2 | 700 | " |
| " | " | " | 51 | 59 | 1.6 | 1400 | " |
| " | " | " | 51 | 65 | 2.8 | 2400 | " |
| " | " | " | " | " | " | " | " |
| " | " | " | 55 | 57 | 0.4 | 300 | " |
| 10 | 10 | 20 | 46 | 54 | 0.8 | 700 | 450 |
| " | " | " | " | " | " | " | " |
| 4–5 | 5–6 | (9–11) | 46–54 | 50–58 | 0.2–1.8 | 1000 | " |
| 15 | 15 | 40 | 0 | 100 | 6.7 | 6000 | 100 |
| " | " | " | " | " | " | " | " |

Thin films of Samples Nos. 1 to 11 have a spontaneous magnetization of 450 emu/cc, which is equal to that of the bulks of the alloys. Thus, it is apparent from this fact that the thin films have attained the first object of the present invention.

Among the minimum $x_1$ values of the atomic concentration of Mn in these Samples, the lowest value is 45% by atom for Sample No. 3, whereas among the maximum $x_2$ values the highest value is 65% by atom for Samples Nos. 6 and 7. Thus, the range of changes in the atomic concentration of Mn is 45 to 65% by atom. Furthermore, even if the number of stacked layers is changed between 50 and 1,000, a spontaneous magnetization of 450 emu/cc can be obtained. Even if the span of each region is changed between 8 Å and 20 Å, a spontaneous magnetization of 450 emu/cc can be obtained. Thus, it is apparent from the foregoing fact that the thin film of various structures, that is, different numbers of stacked layers and the span of each region (=a+b+c+d in Shape of Distribution in the Table) can have a spontaneous magnetization equivalent to that of the bulks of the alloys.

Sample No. 11 has such a structure that the span of each region and the minimum and maximum value of the atomic concentration of Mn take random values in the direction perpendicular to the film plane. Even the sample of such a structure has a spontaneous magnetization of 450 emu/cc, which is equal to that of samples having these three parameters set to constants. Thus, so long as the atomic concentration of Mn is in a range of 45 to 65% by atom, even thin films having different structures, that is, different numbers of stacked layers, span of each region and minimum and maximum values of the atomic concentration of Mn can have a spontaneous magnetization that is equivalent to that of the bulks of the alloys.

Samples Nos. 12 and 13 have a spontaneous magnetization of 100 emu/cc, which is lower than that of the bulks of the alloys, because it seems that the atomic concentration of Mn is changed between 0 and 100% by atom in these thin films.

In portions of these films, that is, the region where the concentration of Mn is 45 to 65% by atom, the $\tau$ phase is formed and its spontaneous magnetization is an equivalent value to that of the bulks of the alloys, that is, 450 emu/cc, whereas in the regions outside the foregoing range of the atomic concentration of Mn the $\epsilon$ phase is formed and its spontaneous magnetization is zero. The spontaneous magnetization of such thin films is an average of the values of these two regions. In these Samples there are the $\tau$ phase region and the $\epsilon$ phase region in a ratio in film thickness of the former to the latter of 1:3, and thus the average spontaneous magnetization can be calculated as follows:

$$450 \times 1/(1+3) = 112 \; emu/cc$$

The calculated value is roughly equal to the foregoing value of 100 emu/cc. Thus, it is apparent also from this fact that the atomic concentration of Mn ranging from 45 to 65% by atom is a condition for generating the ferromagnetic property.

The second object of the present invention can be attained by preparing a thin film of Mn-Al in which the atomic concentration of Mn is substantially constant in the direction of the film plane and changed in the direction perpendicular to the film plane, and the atomic concentration of Mn is in a range of 45 to 65% by atom and is changed in the range in at least one portion of the film.

As is apparent from the foregoing Table, the anisotropy field is generated in all the Samples, and thus the films satisfy the second object of the present invention. Particularly, Samples Nos. 12 and 13 have an anisotropy field as high as 6,000 Oe, but have a spontaneous magnetization as low as 100 emu/cc. However, these thin films of Samples Nos. 12 and 13 are applicable to media for magneto-optical recording, etc. Characteristics of the foregoing two Samples is a high rate of Mn atomic concentration change, which is apparent from the fact that the rate of Mn atomic concentration change and the anisotropy field are in a proportional relationship in all the Samples in the foregoing Table.

According to one of processes for preparing the present ferromagnetic thin film of Mn-Al, Mn and Al are alternately deposited onto a substrate at a substrate temperature of 200° to 350° C. in vacuum. The substrate is preferably a single crystal of NaCl type with the {100} plane, particularly a MgO single crystal with the {100} plane.

When the deposition of a thin film is carried out at a low temperature, for example, room temperature, disorder in crystal is considerable and no better characteristics are obtained. In case of ferromagnetic thin films, such adverse effects as a decrease in the spontaneous magnetization, anisotropy field, etc. are observable. When the substrate temperature is too high during the deposition of the thin film, on the other hand, such adverse effects as changes in the film composition, etc. are observable. For example, in case of depositing a plurality of elements having different saturation vapor pressures, the element having a higher saturation vapor pressure is evaporated again from the deposited substrate during the deposition, when the substrate temperature is too high, and thus the desired composition cannot be obtained.

The third object of the present invention has been solved by utilizing peculiar characteristics of a magnetic film composed of manganese and aluminum layers in a stacked structure, disclosed in Disclosure Summary of No. 13 meeting of Society of Applied Magnetics of Japan, page 311 (1989) or Japanese Journal of Applied Physics, Vol. 25, No. 7, July 1989, pp. L 1230–1232, in a magnetic recording medium.

More specifically, the present invention provides (1) a magnetic recording medium comprising a substrate and a magnetic film formed on the substrate, the magnetic film being a thin film in a stacked structure of thin layers of manganese and thin layers of aluminum, laid upon one another alternatingly in the film thickness direction; (2) a magnetic recording medium according to above item 1, wherein the substrate is a MgO substrate and the magnetic film is formed on the (100) plane of the MgO substrate; (3) a magnetic recording medium according to above item 1, wherein the substrate is constituted by a paramagnetic, diamagnetic or nonmagnetic material, coated with MgO; (4) a magnetic recording medium according to above item 3, wherein the paramagnetic, diamagnetic, or nonmagnetic material is sapphire, and the magnetic film is formed on the (210) plane of the sapphire; (5) a magnetic recording medium according to above item 3, wherein the paramagnetic, diamagnetic, or nonmagnetic material is silicon, and the magnetic film is formed on the (100) plane of the silicon; (6) a magnetic recording medium according to any one of above items 1 to 5, wherein the nearest thin layer of the magnetic film to the substrate is a layer of manganese; (7) a magnetic recording medium according to above item 6, wherein total number of the thin layers of manganese and the thin layers of aluminum is an even number and the magnetic film is a perpendicular magnetic film; and (8) a magnetic recording medium according to above item 6, wherein total number of the thin layers of manganese and the thin layers of aluminum is an odd number and the magnetic film is an in-plane magnetic film.

In a magnetic film in a stacked structure of thin layers of manganese and thin layers of aluminum, laid one upon another alternatingly, a ferromagnetism appears around the interfaces between the manganese non-ferromagnetic layers and the aluminum non-ferromagnetic layers, and thus a saturation magnetic flux density, which is proportional to a magnetic moment per unit volume, can be controlled by a thickness of the layers. That is, the saturation magnetic flux density will increase with decreasing thickness of the layers, whereas it will decrease with increasing thickness of the layers.

As a result of tests, it has been found that a magnetic anisotropy will change with the number of layers to be stacked, and a ratio of residual magnetization to saturation magnetization, that is, the so-called squareness ratio will change. Furthermore, it has been found that coercivity largely changes by changing substrate species.

As is obvious from the foregoing, the magnetic properties can be controlled by using only manganese and aluminum and changing only the film structure without mixing a plurality of substances to change mixing ratios, etc.

As is apparent from the foregoing Table, good results can be obtained by forming the present thin film of Mn-Al by heating at a substrate temperature of 200° to 350° C.

The fourth object of the present invention can be attained with a manganese-silicon multi-layer film which comprises thin layers of manganese and thin layers of silicon which are laid upon one another alternatingly.

It is desirable in the present manganese-silicon multi-layer film to form the manganese layer as a first layer in direct contact with the (100) plane or equivalent plane of MgO single crystal as a substrate surface. It is also desirable to use the (100) plane of silicon single crystal or equivalent plane as a substrate surface. Furthermore, good characteristics can be obtained by selecting a substrate temperature of 250°–450° C. when the film is formed.

As mentioned above, a manganese-aluminum multi-layer film can have a high saturation magnetization unobtainable in the alloys. In the film, atoms in the vicinity of the interface between the manganese layer and the aluminum layer play a role of magnetization. Taking this fact into account, the inventors prepared various multi-layer films by laying thin layers of manganese and thin layers of other elements upon one another and studied their characteristic. As a result, the present inventors found that in a multi-layer film comprising thin layers of manganese and thin layers silicon laid upon another a high in saturation magnetization can be obtained and a higher limit temperature that will change the characteristics of the film can be obtained than that of manganese-aluminum multi-layer films.

Silicon element is adjacent to aluminum element in the Periodic Table of Elements and is close to aluminum in the electronic structure. Therefore, it seems that the electronic structure of the manganese-silicon multi-layer film is also close to that of the manganese-aluminum multi-layer film. Hence, it seems that, as described in Japanese Patent Application No. Hei 1-229151, the electron state density at the maximum energy level possessed by electrons in the film, that is, the so-called Fermi energy level, is very high, resulting in a higher saturation magnetization.

Furthermore, the stability against increasing temperature correlates with the melting points of the individual layers constituting the multi-layer film. The melting point of silicon is about 1420° C., which is higher by about 760° C. than that of aluminum, i.e., about 660° C. Therefore, the stability against increasing temperature in the manganese-silicon multi-layer film is higher than that of the manganese-aluminum multi-layer film.

In the following Examples, Mn was deposited at first. When Al was deposited at first, it was found that the spontaneous magnetization and anisotropy field were a little inferior to those of Examples, but were superior to those of the conventional thin films of Mn-Al.

BRIEF DESCRIPTION OF THE DRAWINGS

FIG. 1A is a cross-sectional view of a thin film according to the present invention.

FIG. 1B and FIG. 1C are diagrams showing the distribution of Mn atomic concentration according to the present invention.

DETAILED DESCRIPTION OF THE PREFERRED EMBODIMENTS

Example 1

One embodiment of the present invention will be explained in detail below, referring to FIG. 2 and FIGS. 3A and 3B.

Figure 2:
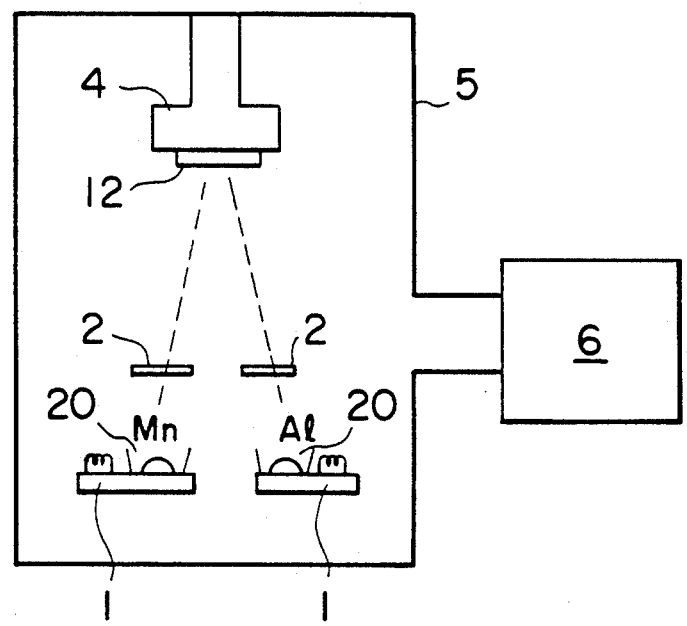
FIG. 2 is a schematic view showing an electron beam vacuum evaporation system for use in the present invention.

In this embodiment, an electron beam vacuum evaporation system shown in FIG. 2 was used.

In a vacuum chamber 5, two electron beam evaporators 1 were provided. Manganese (Mn) and aluminum (Al) were placed in hearths 20 on the electron beam evaporators 1, respectively, and both evaporated at the same time in a vacuum of $1 \times 10^{-9}$ Torr. By alternately releasing two shutters 2 in that state, Mn and Al were alternately deposited onto a glass substrate 12 fixed to a stage 4 in the order of Mn→Al→Mn and so forth. In Sample No. 1 the deposition rates of Mn and Al were each set to 0.5 Å/sec. and the shutters 2 were alternately released at an interval of 10 seconds. Thus, a layer having a thickness of 5 Å was deposited onto the substrate by one release of the shutter 2. 1,000 layers were stacked on the substrate while keeping the substrate temperature at 250° C.

Figure 3A:
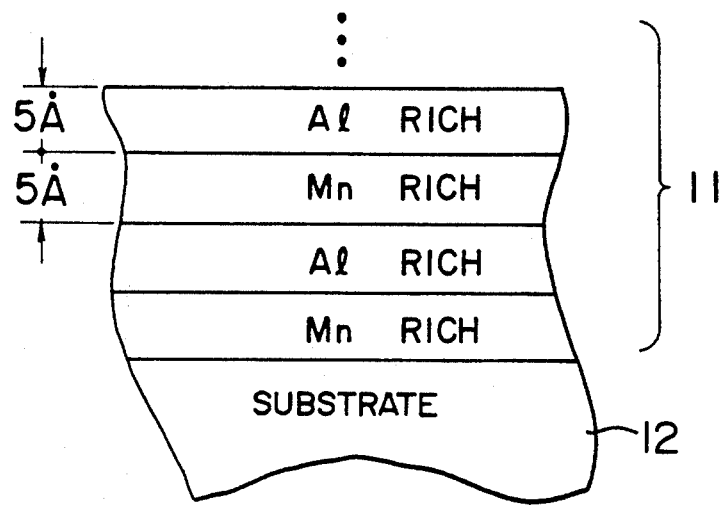
FIG. 3A is a cross-sectional view of a thin film according to Example 1 of the present invention.
Figure 3B:
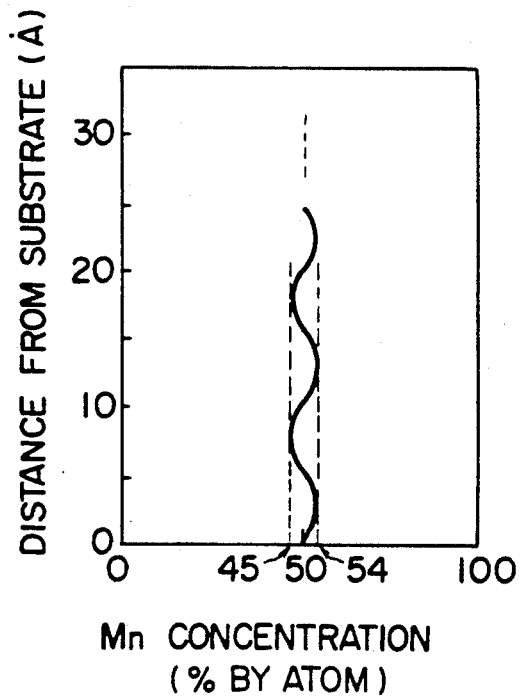
FIG. 3B is a diagram showing the distribution of Mn atomic concentration according to Example 1 of the present invention.

Cross-sectional structure and changes in composition in the direction perpendicular to the film plane of Sample No. 1 are shown in FIG. 3A and 3B, respectively. When the thickness of one deposition layer was 5 Å, interfusion of Mn and Al was made throughout all of the Mn layers and Al layers, and as a result all the layers each having a thickness of 5 Å had changes in the composition. The rate of Mn atomic concentration change in the layers was calculated from the maximum Mn atomic concentration of 54% by atom and the minimum Mn atomic concentration of 46% by atom according to the following equation:

$$\frac{54\% \text{ by atom} - 46\% \text{ by atom}}{5 \text{ Å}} = 1.6\%/\text{Å}$$

The magnetic properties of the thus obtained thin film were measured and it was found that the spontaneous magnetization of the thin film was 450 emu/cc, which was equal to that of the bulk of alloy and the anisotropy field was 1,400 Oe.

Furthermore, various thin films were prepared under varied deposition conditions. That is, deposition conditions were changed by changing a substrate temperature during the deposition, a shutter release time for Mn and that for Al, a deposition rate and number of stacked layers. The deposition conditions for the thus prepared Samples Nos. 2 to 10 are shown in the foregoing Table. Distribution of Mn atomic concentration and two magnetic properties, i.e. anisotropy field and spontaneous magnetization, of these Samples are also shown in the foregoing Table.

Substrates were MgO single crystals with the {100} plane for Samples Nos. 6 to 8, and glass for other Samples. Mn and Al were alternately deposited onto these two substrates at a substrate temperature of 200° to 350° C. by releasing the shutters 2 in the order of Mn→Al→Mn and so forth. The deposition rate was 0.5 Å/sec or 1 Å/sec and the shutter release time was in a range of 8 to 12 seconds.

The distribution of Mn atomic concentration in the direction perpendicular to the film plane depends upon a substrate temperature, a shutter release time and a deposition rate. The interdiffusion of Mn and Al was made throughout all the Mn layers and Al layers also in Samples Nos. 2 to 10, and thus all the layers had changes in the composition. That is, there were only regions where the composition was changed. The span of each region where the Mn atomic composition was changed, that is, the value c or d, of all these Samples was in a range of 4 to 6 Å. these Samples was in a range The Mn atomic concentration of all these Samples was in a range of 45 to 65% by atom. The spontaneous magnetization of Samples Nos. 2 to 10 was 450 emu/cc, which was equal to that of the bulks of alloys. As is apparent from comparison of Sample No. 1 with Sample No. 2 and comparison of Sample No. 6 with Sample No. 7, the spontaneous magnetization of the thin films was not changed even by changing the number of stacked layers.

The anisotropy field of Samples Nos. 2 to 10 was varied from 300 Oe to 2,200 Oe, as shown in the foregoing Table, which was proportional to the rate of Mn atomic concentration change. Thus, an increase in the anisotropy field was attained by selecting deposition conditions for increasing the rate of Mn atomic concentration change.

Example 2

Another embodiment of the present invention will be described in detail below, referring to FIG. 4A and FIG. 4B.

Sample No. 11 was prepared in the vacuum evaporation system shown in FIG. 2. Mn and Al were alternately deposited onto a glass substrate 12 at a deposition rate of 0.5 Å/sec and a substrate temperature of 250° C. in the order of Mn→Al→Mn and so forth to deposit total 1,000 layers. In this embodiment, the deposition time of Mn and Al was changed at random. To this end, the shutter release time was changed in a range of 10 seconds to 12 seconds for Mn and 8 seconds to 10 seconds for Al.

Figure 4A:
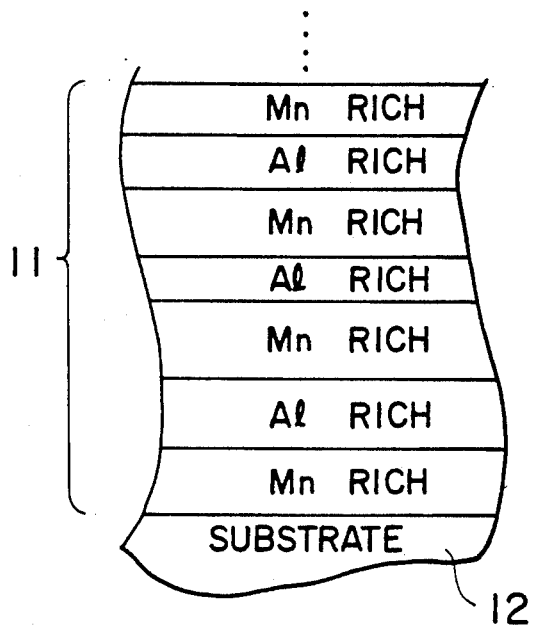
FIG. 4A is a cross-sectional view of a thin film according to Example 2 of the present invention.
Figure 4B:
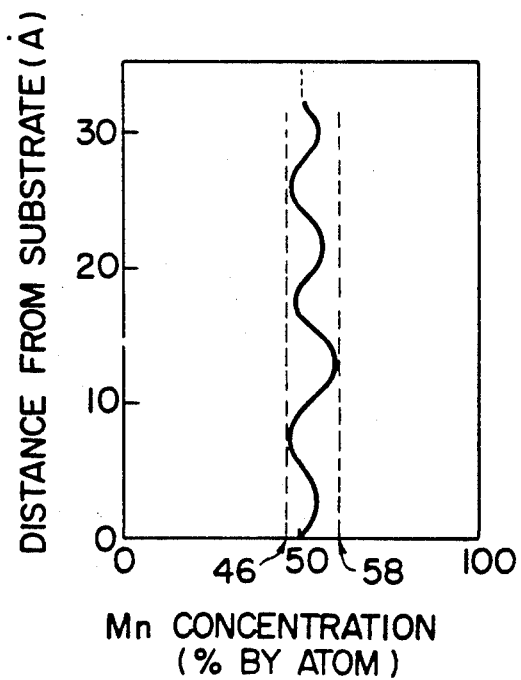
FIG. 4B is a diagram showing the distribution of Mn atomic concentration according to Example 2 of the present invention.

As a result, a ferromagnetic thin film in which Mn-rich layers and Al-rich layers were alternately stacked, as shown in FIG. 4A, was prepared. The thickness of the layers was not equal to that of Example 1. Furthermore, the maximum and minimum Mn atomic concentrations were also different from those of Example 1 and were not constant. The maximum Mn atomic concentration was 58% by atom and the minimum was 46% by atom.

The ferromagnetic thin film of this embodiment had a spontaneous magnetization of 450 emu/cc, which was equal to that of the bulk of alloy. Furthermore, the anisotropy field was 1,000 Oe.

Example 3

Figure 5A:
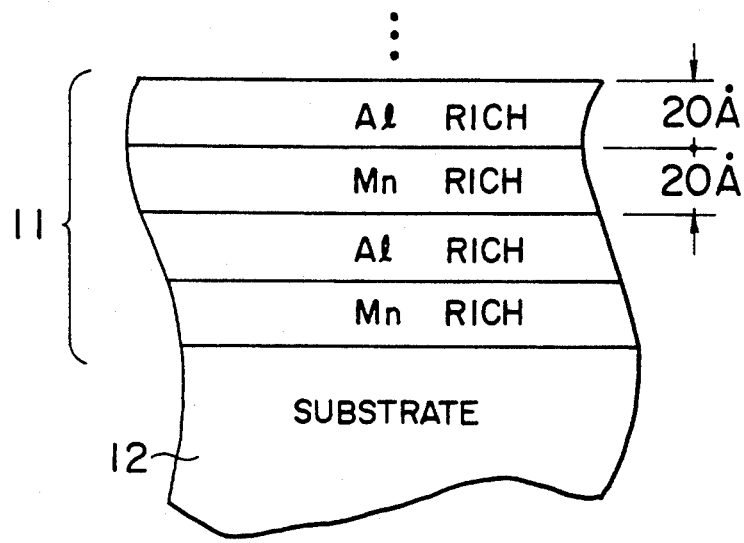
FIG. 5A is a cross-sectional view of a thin film according to Example 3 of the present invention.

A further embodiment of developing a magnetic anisotropy will be described in detail below, referring to FIG. 5A and FIG. 5B.

The magnetic anisotropy relates to a symmetry and thus increases with increasing change in the composition. The deposition conditions for Sample No. 12 were selected from this point of view, and an extreme structure, in which the Mn atomic concentration was changed from 0% by atom to 100% by atom was formed. FIG. 5A shows a thin film 11 of stacked structure having Mn-rich layers and Al-rich layers, prepared under these conditions, where 1,000 layers each having a thickness of 20 Å were stacked on a glass substrate 12.

The thin film 11 was prepared in the following manner.

Mn and Al were alternately deposited onto a glass substrate 12 at a deposition rate of 0.5 Å/sec and a substrate temperature of 200° C. in the order of Mn→Al→Mn and so forth to deposit total 1,000 layers. In this embodiment, the deposition time of Mn and Al was prolonged to 40 seconds, and also the low substrate temperature, that is, 200° C., was selected.

On this embodiment, there were regions where both Mn and Al were not mixed at all by the interfusion of Mn and Al during the deposition owing to the prolonged deposition time and the consequent increased thickness of the deposited layers. As a result, the Mn atomic concentration was changed from 0% by atom to 100% by atom, and the thickness of each region where the Mn atomic concentration was changed was 15 Å. Thus, the rate of Mn atomic concentration change was calculated as follows:

$$100\% \text{ by atom}/15 \text{ Å} = 6.7\%/\text{Å}$$

That is, a large rate of Mn atomic concentration change was obtained. As a result of measuring the magnetic properties of the film 11, it was found that the anisotropy field was as large as 6,000 Oe, and the spontaneous magnetization was 100 emu/cc. The spontaneous field was smaller than that of Examples 1 and 2, because the Mn atomic concentration of the films of Examples 1 and 2 was 45 to 65% by atom, whereas that of the film of this Example was deviated from the former range. The region of the film where the Mn atomic concentration was changed in a range of 45 to 65% by atom was in the τ phase, whereas the region outside the former range was in the ε phase.

Figure 5B:
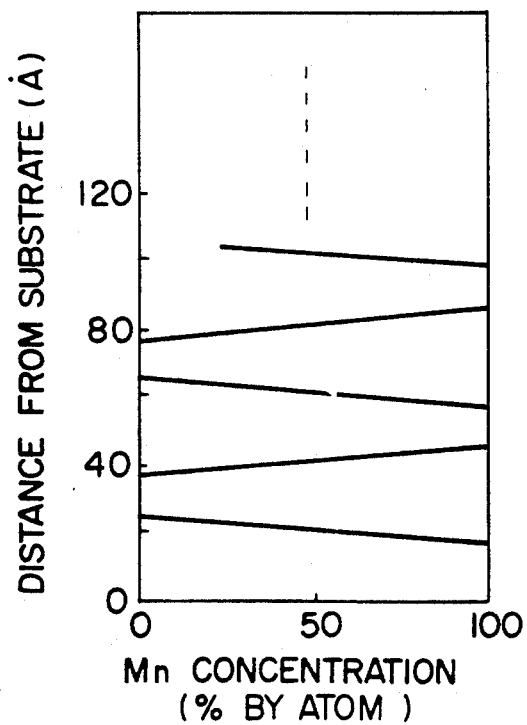
FIG. 5B is a diagram showing the distribution of Mn atomic concentration according to Example 3 of the present invention.

As is apparent from FIG. 5B, these phases are in a layered structure, and one and same phase prevails in one layer. The $\tau$ phase is ferromagnetic and its spontaneous magnetization is 450 emu/cc, whereas the $\epsilon$ phase is not ferromagnetic and thus its spontaneous magnetization is zero. The spontaneous magnetization of the entire film is an average of the spontaneous magnetizations of the ferromagnetic layers and non-ferromagnetic layers. In this Example the thickness of the $\tau$ phase region and that of the $\epsilon$ phase region was in a ratio of the former to the latter of 1:3, and thus the average of spontaneous magnetization was calculated as follows:

$$450 \times 1/(1+3) = 112 \ emu/cc$$

This value was roughly equal to the aforementioned 100 emu/cc.

Example 4

Figure 6:
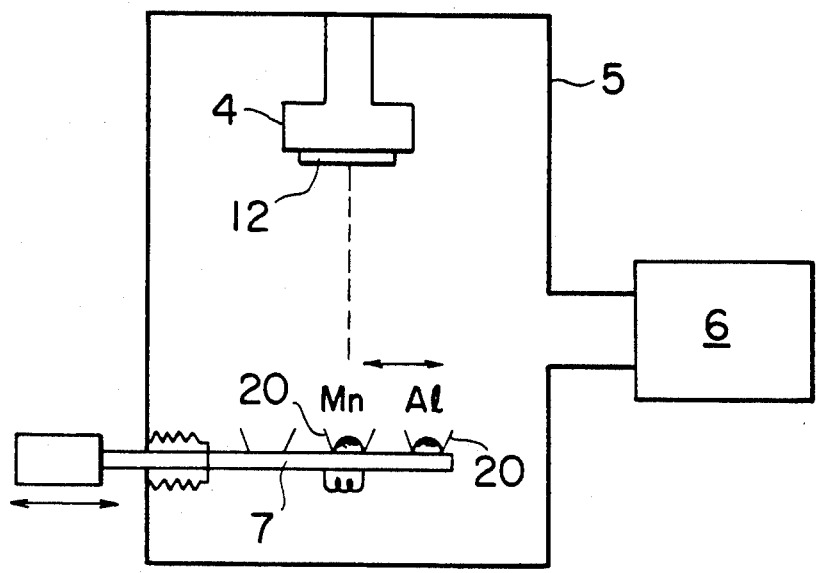
FIG. 6 is a schematic view showing an electron beam vacuum evaporation system for use in the present invention.

In this Example, an electron beam vacuum evaporation system shown in FIG. 6 was used.

Mn and Al were placed in two hearths 20, respectively, on an electron beam evaporator 7 and alternately deposited onto a glass substrate 12 by changing the positions of the hearths 20 at an interval of 10 seconds in the order of Mn→Al→Mn and so forth at a deposition rate of 5 Å/sec. in terms of the deposited film thickness and at a substrate temperature of 250° C. to deposit total 1,000 layers.

In this Example, there are regions where Mn and Al are not mixed together even by the interdiffusion of Mn and Al during the deposition, as in Example 3.

Example 5

Figure 7:
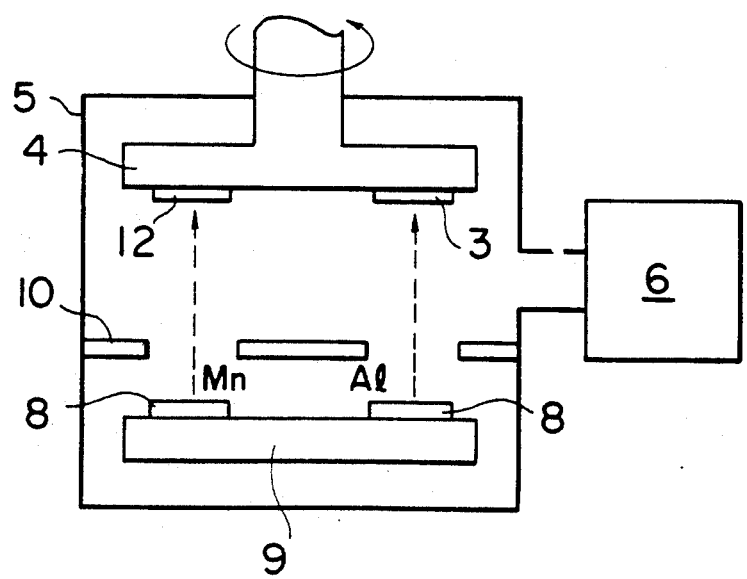
FIG. 7 is a schematic view showing a sputtering deposition system for use in the present invention.

In this Example, a sputtering deposition system shown in FIG. 7 was used.

Mn particles and Al particles were emitted from two targets 8, i.e. Mn target and Al target, mounted on a target holder 9, by sputtering and deposited alternately onto a substrate 12 fixed to a stage 4 provided opposite to the surfaces of targets 8, while turning the stage 4. Turning speed of stage 4 and sputtering conditions were adjusted so as to make each deposition of Mn and Al 5 Å thick in terms of the film thickness. The substrate temperature was 250° C. and total 1,000 layers were stacked.

In this Example, a thin film of the same structure as that of Sample No. 1 of Example 1 was obtained, and its spontaneous magnetization was 450 emu/cc and the anisotropy field was 1,400 Oe.

The layer thickness could be changed to various degree by changing the turning speed of stage 4 in the sputtering deposition system.

Examples 6–21

Figure 8:
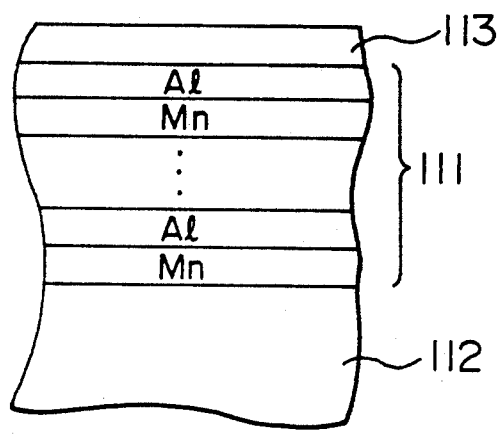
FIGS. 8 and 9 are cross-sectional views of the embodiment of the present invention.

Embodiments of the present invention will be explained below, referring to FIG. 8.

In the examples, a magnetic film 111 is prepared by alternate deposition of manganese layers and aluminum layers on a substrate 112 by vacuum evaporation where the first layer is a manganese layer in all the examples. Degree of vacuum is in the order of $10^{-7}$ during the film formation, and the substrate temperature is 300° C. Then, a protective layer 113 of $SiO_2$ is formed to a thickness of a 100 Å on the magnetic film 111. The $SiO_2$ acts as a protective film.

As shown in Table 2, MgO (100) is used as substrate 112, and each layer of magnetic film 111 is 100 Å thick throughout the Mn layers and the Al layers, and number of layers is changed from 7 to 10 in Examples 6 to 9, and is 19 and 20 in Examples 10 and 11, respectively. There are no large differences in the saturation flux density among these six kinds of test pieces.

TABLE 2

| Example No. | Substrate | Thickness of each layer (Å) | Number of layers | Saturation magnetic flux density $4\pi Ms$ (G) | Squareness ratio | | Coercivity (kOe) | |
|---|---|---|---|---|---|---|---|---|
| | | | | | $Mr^\perp/Ms$ | $Mr|/Ms|$ | $Hc^\perp$ | $Hc|$ |
| 6 | MgO (100) | 100 | 7 | 2300 | 0.18 | 0.74 | 0.46 | 0.42 |
| 7 | " | " | 8 | 2400 | 0.91 | 0.68 | 2.06 | 1.86 |
| 8 | " | " | 9 | 2300 | 0.19 | 0.75 | 0.45 | 0.41 |
| 9 | " | " | 10 | 2100 | 0.76 | 0.67 | 1.75 | 1.65 |
| 10 | " | " | 19 | 2200 | 0.18 | 0.76 | 0.40 | 0.40 |
| 11 | " | " | 20 | 2250 | 0.82 | 0.64 | 2.00 | 1.48 |
| 12 | " | 50 | 9 | 4100 | 0.18 | 0.72 | 0.46 | 0.40 |
| 13 | " | " | 10 | 4200 | 0.77 | 0.66 | 1.80 | 1.72 |
| 14 | " | 20 | 9 | 10300 | 0.20 | 0.78 | 0.50 | 0.50 |
| 15 | " | " | 10 | 10500 | 0.95 | 0.73 | 2.50 | 1.94 |
| 16 | $Al_2O_3$ (210) | 100 | 9 | 2200 | 0.19 | 0.75 | 0.46 | 0.42 |
| 17 | " | " | 10 | 2250 | 0.75 | 0.68 | 1.75 | 1.65 |
| 18 | Si (100) | " | 9 | 2250 | 0.25 | 0.83 | 0.68 | 0.62 |
| 19 | " | " | 10 | 2300 | 0.92 | 0.70 | 2.86 | 2.55 |
| 20 | LiF (100) | " | 9 | 2300 | 0.26 | 0.85 | 0.70 | 0.64 |
| 21 | " | " | 10 | 2300 | 0.95 | 0.72 | 3.20 | 2.60 |

However, the values of squareness ratio and coercivity are considerably different between even number of layers and odd number of layers.

In case of even number of layers, the squareness ratio in the perpendicular direction to the film surface, $Mr^\perp/Ms^\perp$, is larger than that in the parallel direction to the film surface, $Mr|/Ms|$. Values of $Mr^\perp/Ms^\perp$ are as large as 0.76–0.91, which mean good values, and the coercivity is 1.75–2.06 kOe in the perpendicular direction to the film surface, which means sufficiently large values. That is, in case of even number layers, good magnetic characteristics can be obtained for a perpendicular magnetic recording medium.

In case of odd number of layers, squareness ratio in the parallel direction to the film surface, $Mr|/Ms|$, is larger than the squareness ratio in the perpendicular direction to the film surface, $Mr^\perp/Ms^\perp$, and thus the magnetic recording medium with odd number of layers is suitable for the inplane magnetic recording them for the perpendicular magnetic recording.

Examples 12 and 13 are directed to a thickness of each layer of 50 Å while the substrate 112 is of the same MgO (110), and the number of layers are 9 and 10 in Examples 12 and 13, respectively. Even in these two test pieces, $Mr^\perp Ms^\perp$ is larger than $Mr|/Ms|$. When the number of layers is even, and the squareness ratio in the parallel direction to the film surface, $Mr|/Ms|$, is larger than the squareness ratio in the perpendicular direction to the film surface, $Mr^\perp/Ms^\perp$. That is, the same thing applies to this case as in case of the thickness of each layer of 100 Å. However, the saturation magnetic flux density is about twice as large as that in case of thickness of each layer of 100 Å.

Examples 14 and 15 are directed to thickness of each layer of 20 Å while the substrate 112 is of the same MgO (100), and have numbers of each layer of 9 and 10, respectively. In these two test pieces, $Mr^\perp/Ms^\perp$ is larger than $Mr|/Ms|$ in case of even number of layers, and squareness ratio in the parallel direction in the film surface, $Mr|/Ms|$, is larger than squareness ratio in the perpendicular direction to the film thickness, $Mr^\perp/Ms^\perp$. Thus, the same thing is applied to this case as in case of thickness of each layer of 100 Å and 50 Å. However, the saturation magnetic flux density is about 5 times as large as that in case of thickness of each layer of 100 Å.

As is evident from the foregoing, the saturation magnetic flux density is approximately in an inverse proportion to the layer thickness and thus the saturation magnetic flux density can be controlled by changing the layer thickness. Furthermore, the squareness ratio and the coercivity tend to increase with decreasing layer thickness.

Figure 9:
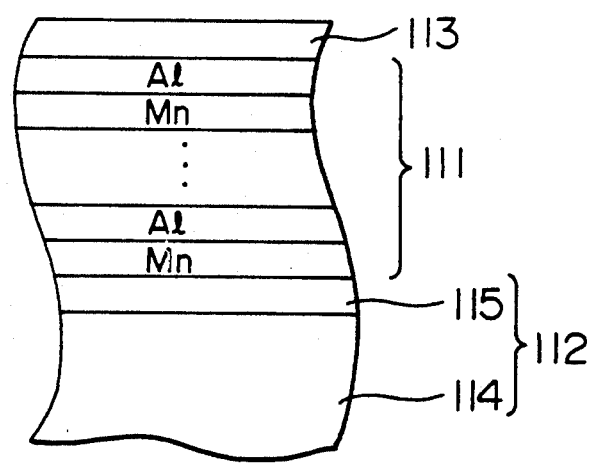

Examples 16 and 17 are directed to alternate deposition of manganese layers and aluminum layers, 100 Å thick for each layer, in a stacked structure, on an MgO layer 115 deposited to a thickness of 200 Å by evaporation onto the (210) plane of a sapphire ($Al_2O_3$) plate 114 as a substrate, as shown in FIG. 9, and have numbers of layers 9 and 10, respectively. As is obvious from Table 2, these two test pieces have substantially the same characteristics as those in case of numbers of layers, 100 Å for each layer, of 9 and 10, respectively on MgO (100) substrates.

Examples 18 and 19 are directed to alternate deposition of manganese layers and aluminum layers, 100 Å for each layer, in a stacked structure, on an MgO layer 115 formed to a thickness of 200 Å on the (100) plane of Si plate 114 as a substrate 112, and have numbers of layers of 9 and 10, respectively. As is obvious from Table 2, these two test pieces have a saturation magnetic flux density of same level as that in case of numbers of layers, 100 Å thick for each layer, of 9 and 10 on MgO (100) substrates. However, the coercivity is $Hc^\perp=0.68$ kOe and $Hc|=0.62$ kOe in case of 9 layers and $Hc^\perp=2.86$ kOe and $Hc|=2.55$ kOe in case of 10 layers, which are larger than those in case of MgO (100) substrates.

Examples 20 and 21 are directed to alternate deposition of manganese layers and aluminum layers, 100 Å thick for each layer, on an MgO layer 115 formed to a thickness of 200 Å on the (100) plane of an LiF plate as a substrate 114, and have numbers of layer of 9 and 10, respectively. Substrate 114 can compose paramagnetics, diamagnetic, or nonmagnetic material. As is obvious from Table 2, the saturation magnetic flux density is on the same level as that in case of MgO (100) substrate, but the coercivity is considerably larger, for example, $Hc^\perp=0.70$ kOe and $Hc|=0.64$ kOe in case of 9 layers, and $Hc^\perp=3.20$ kOe and $Hc|=2.60$ kOe in case of 10 layers.

Throughout the foregoing Examples, a manganese layer is used as a first layer, but magnetic characteristics applicable to recording can be also obtained with an aluminum layer as the first layer, though the characteristics are not better.

As described above, magnetic characteristics can be changed in a film in a stacked structure composed of manganese layers and aluminum layers, laid one upon another alternately, by changing structures such as layer thickness, number of layers and substrate species.

In the present invention, magnetic characteristics can be largely changed only by changing structures such as layer thickness, number of layers and substrate species, and thus it is easy to optimize the magnetic characteristics of a magnetic recording medium.

Example 22

Figure 10:
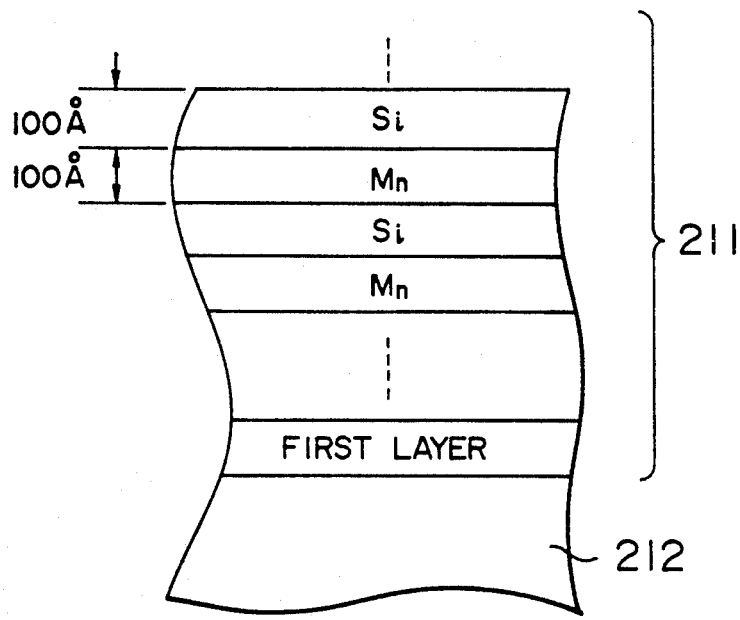
FIG. 10 is a cross-sectional view of the multi-layer film of Example 22 according to the present invention.

FIG. 10 shows a multi-layer film 211 which comprises thin layers of manganese (Mn) and thin layers of silicon (Si), laid upon one another alternatingly on a substrate 212 to each layer thickness of 100 Å. The lamination was carried out by vacuum vapor deposition under vacuum in the order of $10^{-9}$ Torr. The substrate temperature at the vacuum vapor deposition was 380° C. Glass, MgO single crystal with the surface in the (100) plane [hereinafter referred to as "MgO(100)"], MgO single crystal with the surface in the (111) plane [MgO(111)], silicon single crystal with the surface in the (100) plane [Si(100)], and silicon single crystal with the surface in the (111) plane [Si(111)] were used as substrates. Moreover, films with the Mn layer in direct contact with the substrate surface as the first layer and films with the Si layer as the first layer were prepared.

Saturation magnetization of the thus prepared multi-layer films are shown in Table 3, from which it is apparent that all of films showed saturation magnetization of more than zero. This means that the films were ferromagnetic members. Above all, saturation magnetization was especially high in the case of a MgO(100) substrate with the Mn layer as the first layer and a Si(100) substrate with the Si layer or Mn layer as the first layer.

TABLE 3

| Substrate | First layer | Saturation magnetization |
|---|---|---|
| Glass | Mn | 0.018 |
| Glass | Si | 0.017 |
| MgO (100) | Mn | 0.062 |
| MgO (100) | Si | 0.027 |
| MgO (111) | Mn | 0.024 |
| MgO (111) | Si | 0.024 |
| Si (100) | Mn | 0.062 |
| Si (100) | Si | 0.062 |
| Si (111) | Mn | 0.018 |
| Si (111) | Si | 0.019 |

Furthermore, it was found that in the films having an especially high saturation magnetization, Mn was in an α phase and the α-Mn crystal was oriented in the (100) plane direction.

Table 4 shows saturation magnetization when the substrate temperature was changed in forming the multi-layer films having the structure of FIG. 10.

TABLE 4

| Substrate temperature (°C.) | Saturation magnetization (T) |
|---|---|
| 200 | 0.006 |
| 250 | 0.035 |
| 300 | 0.054 |
| 350 | 0.062 |
| 400 | 0 062 |
| 450 | 0.055 |
| 500 | 0.008 |

In Table 4, saturation magnetization is shown for cases of MgO(100) substrate with the first Mn layer and of Si(100) substrate with the first Si or Mn layer. The substrate temperature was changed from 200° C. to 500° C. at intervals of 50° C. No difference was found in the saturation magnetization between these two combinations of the substrate and the first layer and sufficient saturation magnetization was obtained in a range of 250° to 450° C. At a substrate temperature of 200° C. or 500° C., the saturation magnetization was very low. Thus, in order to improve ferromagnetic properties, it is desirable to set the substrate temperature in a range of 250° to 450° C.

As in the manganese-aluminum multi-layer film mentioned above, atoms in vicinity of the interface play a role of magnetization. Therefore, the saturation magnetization can be increased by decreasing thickness of the thin layers to be placed upon one another.

Example 23

Figure 11:
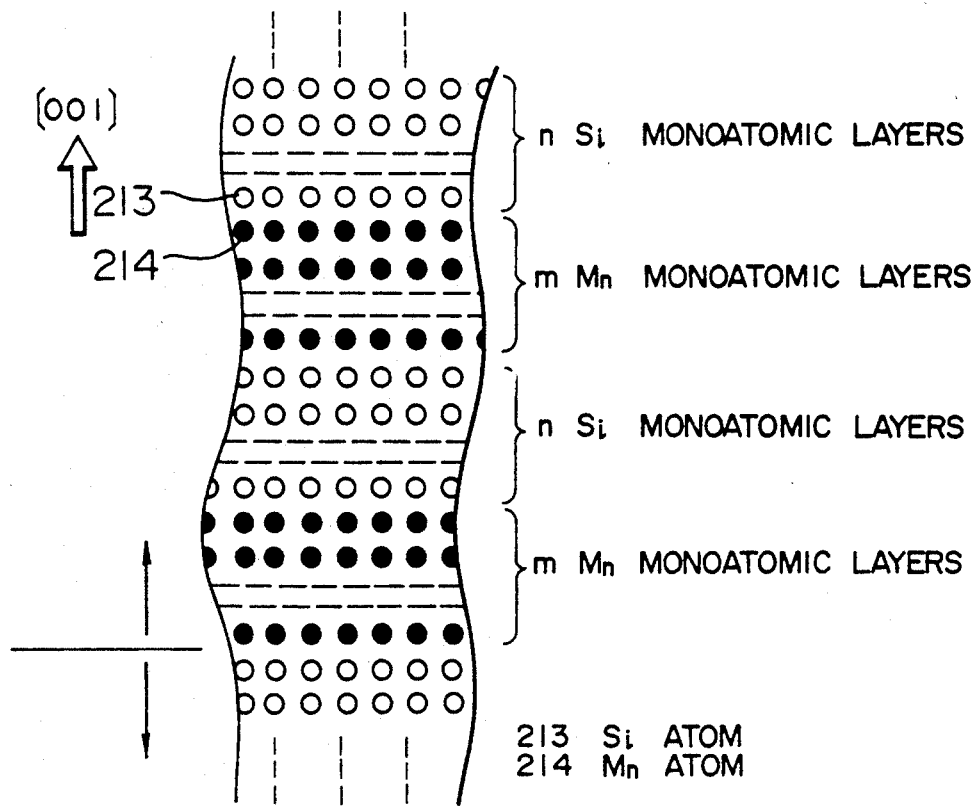
FIG. 11 is a cross-sectional view of the multi-layer film of Example 23 according to the present invention.

FIG. 11 shows an embodiment of a film having a much smaller layer thickness. The film is a multi-layer film which comprises very thin layers of manganese (Mn) and very thin layers silicon (Si) which were alternatingly laid upon one another on a substrate 212 by vacuum vapor deposition under vacuum in the order of $10^{-10}$ Torr. Thickness of the layer was determined by counting the monoatomic layers by measuring vibration of diffraction intensity in reflection type high-speed electron diffraction, where 213 shows Si atoms and 214 shows Mn atoms. In the present Example, the MgO(100) substrate was also used with the first Mn layer and the Si(100) substrate was used with the first Si or Mn layer. The thickness of the individual Si layer (n monoatomic layers) was changed to thickness of a single monoatomic layer, tetratomic layer (4 monoatomic layers), hexatomic layer (6 monoatomic layers) or a higher atomic layer and the thickness of the Mn layer (m monoatomic layers) was changed to thickness of diatomic layer (2 monoatomic layers) to dodecaatomic layer (12 monoatomic layers). Table 5 shows relations between the thickness of Mn layer, the thickness of Si layer and the saturation magnetization.

TABLE 5

| Thickness of Mn layer, m, in m monoatomic layers | Thickness of Si layer, n, in n monoatomic layer | Saturation magnetization (T) |
|---|---|---|
| 10 | 1 | 1.5 |
| 8 | 1 | 2.3 |
| 6 | 1 | 2.6 |
| 4 | 1 | 2.7 |
| 2 | 1 | 2.2 |
| 12 | 4 | 1.6 |
| 10 | 4 | 2.5 |
| 8 | 4 | 2.6 |
| 6 | 4 | 2.7 |
| 4 | 4 | 1.5 |
| 2 | 4 | 0.6 |
| 12 | 6 | 1.2 |
| 10 | 6 | 1.9 |
| 8 | 6 | 2.2 |
| 6 | 6 | 2.0 |
| 4 | 6 | 1.1 |
| 2 | 6 | 0.4 |

As is apparent from Table 5, when the thickness of Si layer was that of single monoatomic layer and when the thickness of Mn layer was that of 2 to 8 monoatomic layers, the saturation magnetization was higher than the critical saturation magnetization in the aforementioned alloys, i.e., about 2.2 tesla (T). Furthermore, when the thickness of Si layer was that of 4 monoatomic layers and when the thickness of Mn layer was that of 6 to 10 monoatomic layers, the saturation magnetization was higher than the critical one. Moreover, when the thickness of Si layer was that of 6 monoatomic layers and when the thickness of Mn layer was that of 8 monoatomic layers, the saturation magnetization was higher than the critical one. However, when the thickness of Si layer exceeded that of 6 monoatomic layers, the saturation magnetization failed to exceed the critical one even when the thickness of Mn layer was changed to any degree. The foregoing behavior seems due to that the ferromagnetism occurred in the vicinity of the interface and when the thickness of Mn layer of Si layer is too large, volume of non-ferromagnetic domain increases, resulting in decrease in the saturation magnetization as average magnetization per unit volume.

No change was found in the characteristics of all the manganese-silicon multi-layer films shown in the foregoing Examples 22 and 23 even when heated to 500° C. Thus, a sufficient heat stability can be obtained in the present invention.

According to the present invention, magnetic films of a high saturation magnetization and a high heat stability can be obtained and, hence, characteristics of magnetic devices can be improved with the present films.

What is claimed is:

1. A manganese-silicon magnetic multi-layer film which comprises a plurality of thin layers of manganese and a plurality of thin layers of silicon, laid directly upon one another alternatingly whereby a high saturization magnetization is obtained.

2. A manganese-silicon magnetic multi-layer film according to claim 1, wherein the silicon layers have a thickness of up to and including a hexatomic layer (6 monoatomic layers).

3. A manganese-silicon magnetic multi-layer film according to claim 1, wherein the manganese is of α phase and is oriented in the (100) plane direction.

4. A manganese-silicon magnetic multi-layer film according to claim 3, wherein a (100) plane of MgO single crystal is used as a substrate surface.

5. A manganese-silicon magnetic multi-layer film according to claim 4, wherein a layer deposited in direct contact with the substrate is a manganese layer.

6. A manganese-silicon magnetic multi-layer film according to claim 1, wherein a (100) plane of silicon single crystal is used as a substrate surface.

7. A manganese-silicon magnetic multi-layer film according to claim 1, wherein said high saturization magnetization is 2.2 tesla or greater.

8. A manganese-silicon magnetic multi-layer film comprising thin layers of manganese and thin layers of silicon laid directly upon one another alternatingly, the thin layers of silicon each having a thickness of 1 to 6 monoatomic layers, the film having a saturization magnetization of at least 2.2 tesla.

9. A manganese-silicon magnetic multi-layer film according to claim 8, wherein the thin layers of manganese each have a thickness of up to 10 monoatomic layers.

* * * * *